United States Patent [19]

Makihara et al.

[11] Patent Number: 5,100,204

[45] Date of Patent: Mar. 31, 1992

[54] BLOW MOLDED SEAT FRAME HAVING EMBEDDED MOUNTING MEMBER

[75] Inventors: Hiroyuki Makihara; Takamichi Amano; Shiro Ogaki, all of Hiroshima; Yasuto Watanabe, Iwakuni, all of Japan

[73] Assignees: Toyo Seat Co., Ltd.; Mazda Motor Corp., both of Hiroshima, Japan

[21] Appl. No.: 613,011

[22] Filed: Nov. 15, 1990

[30] Foreign Application Priority Data

Nov. 15, 1989 [JP] Japan .................. 1-133443[U]
Sep. 27, 1990 [JP] Japan .................. 2-101839[U]

[51] Int. Cl.⁵ .................................................. A47C 7/02
[52] U.S. Cl. .................................. 297/452; 297/444; 297/DIG. 2; 29/527.1; 264/516; 52/309.2
[58] Field of Search ............... 297/DIG. 2, 452, 463, 297/444; 29/527.1, 527.2, 530; 52/309.2; 425/DIG. 3; 264/515, 516

[56] References Cited

U.S. PATENT DOCUMENTS

| | | | |
|---|---|---|---|
| 4,246,734 | 1/1981 | Fogle, Jr. et al. | 297/DIG. 2 X |
| 4,323,411 | 4/1982 | Uhlig | 264/516 X |
| 4,342,799 | 8/1982 | Schwochert | 264/516 X |
| 4,608,744 | 9/1986 | Nemoto | 29/527.1 |
| 4,791,765 | 12/1988 | Noggle | 52/309.2 |
| 4,969,813 | 11/1990 | Lee et al. | 264/516 X |

FOREIGN PATENT DOCUMENTS

| | | |
|---|---|---|
| 5374304 | 11/1976 | Japan . |
| 61-3406 | 2/1986 | Japan . |
| 61-8751 | 3/1986 | Japan . |
| 62-18338 | 4/1987 | Japan .................. 264/516 |
| 62-75916 | 5/1987 | Japan . |

Primary Examiner—Kenneth J. Dorner
Assistant Examiner—James M. Gardner

[57] ABSTRACT

A seat frame structure for a vehicle seat having a seat frame main body integrally formed by blow molding of a synthetic resin, and a metal mounting member fixed to a surface of the seat frame main body in an exposed state. The metal mounting member includes an externally exposed mounting member main body, a first edge portion integrally formed on an outer peripheral portion of the mounting member main body, projecting from the outer peripheral portion toward the inner surface side at a predetermined angle, and embedded in the seat frame main body during blow molding of the seat frame main body, at least one hole portion formed in a portion of the mounting member main body located inwardly from its first edge portion, and a second edge portion integrally formed on a peripheral edge of the hole portion, projecting from the mounting member main body toward the inner surface side at a predetermined angle, and embedded in the seat frame main body during blow molding of the seat frame main body.

20 Claims, 8 Drawing Sheets

BLOW MOLDED SEAT FRAME HAVING EMBEDDED MOUNTING MEMBER

BACKGROUND OF THE INVENTION

The present invention relates to a seat frame structure for a vehicle seat and, more particularly, to a seat frame structure for a vehicle, which comprises a seat frame main body integrally formed by blow molding of a synthetic resin.

In a conventional vehicle seat, as disclosed in Japanese Utility Model Publication No. 61-3406, a structure for coupling a seat cushion as a seating portion of a passenger and a seat back as a backrest portion by a hinge knuckle mechanism is known. In a vehicle seat of this type, the seat back and the seat cushion respectively have seat frames having a predetermined stiffness. An outer portion of each seat frame is covered with a trim having a cushion member.

In order to meet a requirement for reducing the weights of vehicles, an attempt is made to form, using a lightweight synthetic resin, a seat frame, which is conventionally made of a metal pipe, as described in the above prior art. For this purpose, as disclosed in, e.g., Japanese Utility Model Application Laid-Open No. 62-75916, a technique for forming a seat frame by blow molding of a synthetic resin has been proposed. According to this blow molding technique, since the sectional shape of a hollow seat frame can be formed into a bag-like shape, the stiffness of the entire seat frame can be increased. According to this blow molding technique, since a backrest portion of a seat back, and a seating portion of a seat cushion can be formed to have recessed states, a so-called cushion function can be obtained, thus providing a comfortable seat. In this manner, various advantages can be provided when a seat frame is formed by blow molding.

In general, although a synthetic resin material is advantageous since it is light in weight, it suffers from a relatively low stiffness. For this reason, when a seat frame is formed by a synthetic resin, if a portion of a synthetic resin seat frame is simply fastened to a hinge plate of a metal hinge knuckle mechanism by bolts when a seat cushion and a seat back are coupled to each other through the hinge knuckle mechanism, a sufficient coupling strength between the hinge knuckle mechanism and the seat frame cannot be assured. Thus, such a seat frame in this state cannot be put into practical applications.

For example, when a seat frame formed by blow molding is to be reinforced, it is basically impossible to entirely embed a reinforcement plate in a resin. For this reason, a stiffening plate may be arranged on the inner surface side of the seat frame. However, in order to arrange the stiffening plate, after the seat frame is blow-molded using only a synthetic resin, a portion thereof must be cut out, and the stiffening plate must be inserted and fixed inside the seat frame. In this manner, a conventional reinforcing operation of a seat frame is troublesome, resulting in poor workability.

In order to fix a mounting member for mounting a hinge plate to a seat frame formed by blow molding of a synthetic resin, it is preferable to fix this mounting member to the outer surface of a resin molded body in an exposed state in consideration of workability and coupling reliability. In this case, however, it is difficult to fix the mounting member to the surface of the seat frame. In addition, as the surface area of the mounting member is increased, not only the peripheral portion of the mounting member but also its central portion must be fixed to the seat frame. For this reason, a demand has arisen for developing a reliable and firm method of fixing the mounting member to the seat frame.

As a method of solving a problem unique to a synthetic resin seat frame, i.e., a decrease in coupling strength with a hinge knuckle mechanism, as disclosed in, e.g., Japanese Utility Model Laid-Open No. 53-74304, an insert molding technique is known. In this technique, a seat frame is formed by injection molding, and a reinforcement plate is entirely embedded in the synthetic resin during injection molding, thereby increasing a stiffness of a portion of a seat frame, which portion is fastened to a hinge plate by bolts.

However, in the technique disclosed in this prior art, a synthetic resin is interposed between the hinge plate and the reinforcement plate. As a result, when a bolt is fastened, the interposed synthetic resin is plastically deformed, and the fastened bolt may be loosened. If the bolt is fastened too strong, the interposed synthetic resin may crack. In this manner, although the stiffness of a portion of the seat frame to be fastened to the hinge plate by bolts can be increased, a coupling strength cannot be ultimately increased. Thus, the insert molding technique using injection molding cannot be applied to formation of the seat frame in practice.

SUMMARY OF THE INVENTION

The present invention has been made in consideration of the above situation, and has as its object to provide a seat frame structure for a vehicle seat, which comprises a seat frame constituted by a seat frame main body obtained by blow-molding a synthetic resin, and a metal mounting member fixed to an outer surface side of the seat frame main body, wherein the seat frame main body and the metal mounting member can be reliably and firmly fixed to each other.

It is another object of the present invention to provide a seat frame structure for a vehicle seat, which allows easy fixing of a metal mounting member to the outer surface side of a seat frame when the seat frame is formed using a blow molding technique.

In order to achieve the above objects, a seat frame structure according to a first aspect of the present invention comprises: a seat frame main body integrally formed by blow molding of a synthetic resin; and a metal mounting member fixed to a surface of the seat frame main body in an exposed state, wherein the metal mounting member includes an externally exposed mounting member main body; a first edge portion integrally formed on an outer peripheral portion of the mounting member main body, projecting from the outer peripheral portion toward an inner surface side at a predetermined angle, and embedded in the seat frame main body during blow molding of the seat frame main body; at least one hole portion formed in a portion of the mounting member main body located inwardly from the first edge portion thereof; and a second edge portion integrally formed on a peripheral edge of the hole portion, projecting from the mounting member main body toward the inner surface side at a predetermined angle, and embedded in the seat frame main body during blow molding of the seat frame main body.

In the seat frame structure according to a second aspect of the present invention, the first edge portion comprises an opening portion for allowing flow of the synthetic resin during blow molding of the seat frame main body.

In the seat frame structure according to a third aspect of the present invention, the first edge portion is formed on the entire outer periphery of the mounting member main body.

In the seat frame structure according to a fourth aspect of the present invention, a plurality of first edge portions are intermittently formed at predetermined intervals on at least a front outer peripheral portion of the mounting member main body, and the mounting member main body integrally comprises extending portions located between the plurality of intermittently formed first edge portions and extending in an extending plane of the mounting member main body.

In the seat frame structure according to a fifth aspect of the present invention, the first edge portion is formed to have an L-shaped section, and comprises, in a distal end portion thereof, an opening portion for allowing flow of the synthetic resin during blow molding of the seat frame main body.

In the seat frame structure according to a sixth aspect of the present invention, the first edge portion comprises a first bent segment bent inwardly from the outer periphery of the mounting member main body at about 90 degrees, and a second bent segment bent forward from the first bent segment at about 90 degrees, and the second bent segment of the first edge portion comprises, in a distal end portion thereof, an opening portion for allowing flow of the synthetic resin during blow molding of the seat frame main body.

In the seat frame structure according to a seventh aspect of the present invention, the mounting member main body is integrally formed by a first planar portion attached to a side surface of the seat frame main body, and a second planar portion attached to a rear surface of the seat frame main body.

In the seat frame structure according to an eighth aspect of the present invention, the mounting member main body integrally comprises a first planar portion attached to a side surface of the seat frame main body, a second planar portion attached to a rear surface of the seat frame main body, and a third portion attached to a front surface of the seat frame main body.

In the seat frame structure according to a ninth aspect of the present invention, the first edge portion extends obliquely with respect to an extending surface of the mounting member main body, and the second edge portion extends obliquely with respect to the extending surface of the mounting member main body.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Various preferred embodiments of a seat frame structure for a vehicle seat according to the present invention will be described in detail hereinafter with reference to the accompanying drawings.

A schematic structure of a vehicle seat 10 to which a seat frame structure according to the present invention is applied will be described below with reference to FIG. 1.

The seat 10 comprises a seat cushion 12 as a seating portion of a passenger, and a seat back 14 as a backrest portion of a passenger. The seat cushion 12 and the seat back 14 as two seat constituting members are coupled to each other through hinge knuckle mechanisms 16. Each hinge knuckle mechanism 16 comprises a cushion-side hinge plate 18 fastened and fixed to the seat cushion 12 side, a back-side hinge plate 20 fastened and fixed to the seat back 14 side, and a ratchet mechanism 22 for pivotally supporting the two hinge plates 18 and 20 to be able to hold them at an arbitrary pivot position.

FIRST EMBODIMENT

A seat frame structure according to the first embodiment used in the seat 10 shown in FIG. 1 will be described below with reference to FIGS. 2 through 5. In the first embodiment, the seat frame structure as the characteristic feature of the present invention is adopted in the seat back 14 side.

Figure 1:
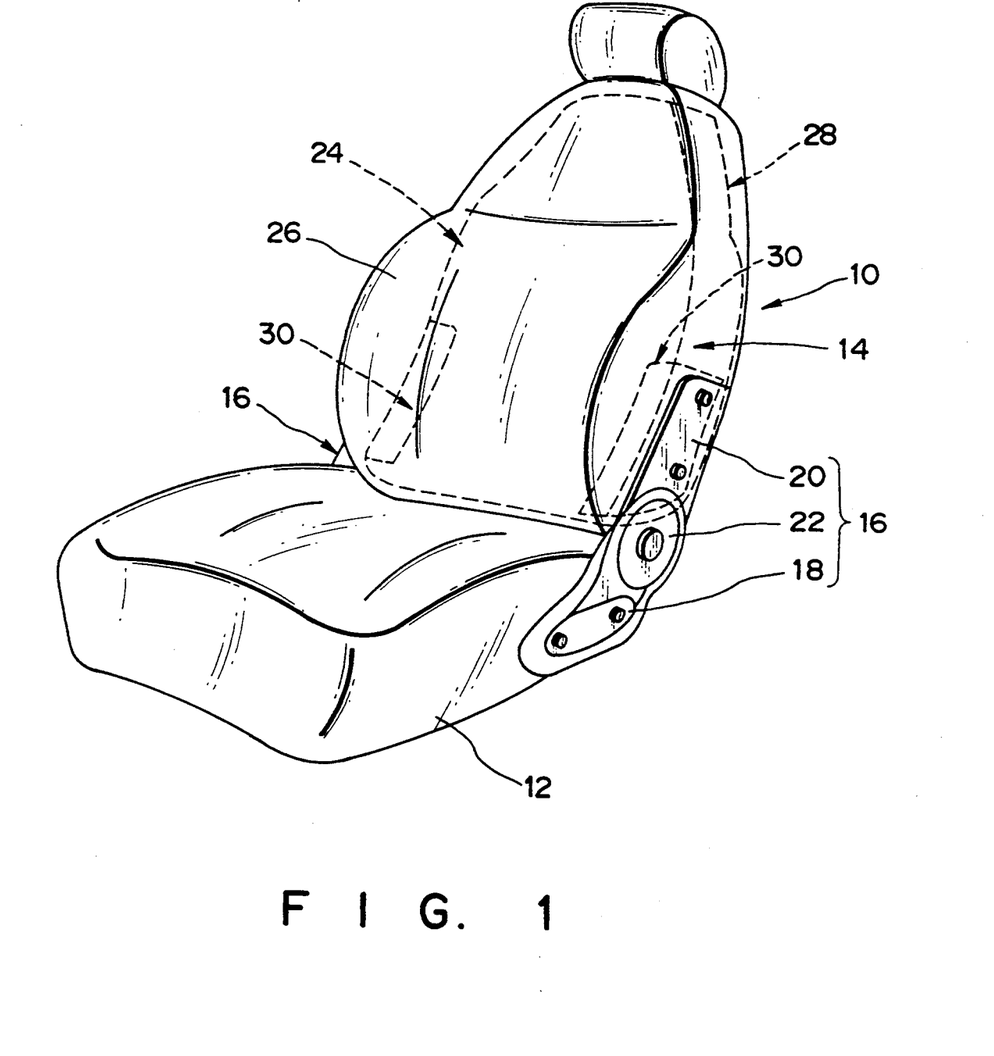
FIG. 1 is a perspective view showing an overall structure of a vehicle seat to which a seat frame structure according to an embodiment of the present invention is applied.

More specifically, and as shown in FIG. 1, the seat back 14 is basically constituted by a seat back frame 24 to which a seat frame structure according to the present invention is applied, and a cushion seat 26 covering an outer portion of the seat back frame 24. The seat back frame 24 is constituted by a seat frame main body 28 integrally formed by blow molding of a synthetic resin, and metal mounting members 30 respectively mounted on both sides of the lower end of the seat frame main body 28. The back-side hinge plate 20 is externally fastened to each metal mounting member 30 by a bolt, so that the seat back frame 24 is coupled to the seat cushion 12 side via the hinge knuckle mechanisms 16.

A detailed structure and operation of the seat back frame 24 will be described in detail below with reference to FIGS. 2 through 5.

Figure 2:
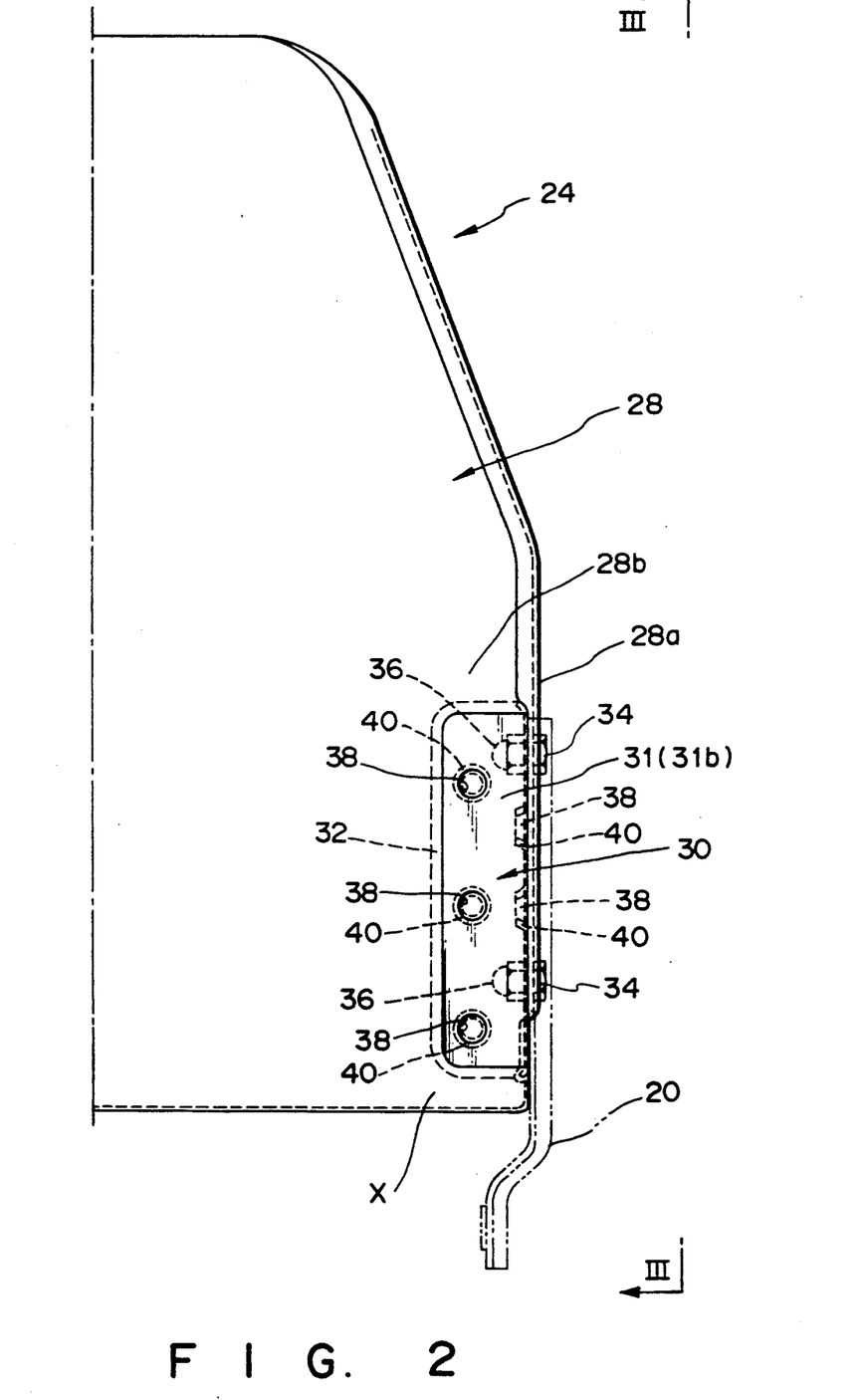
FIG. 2 is a front view of a seat back frame of a seat frame shown in FIG. 1.
Figure 3:
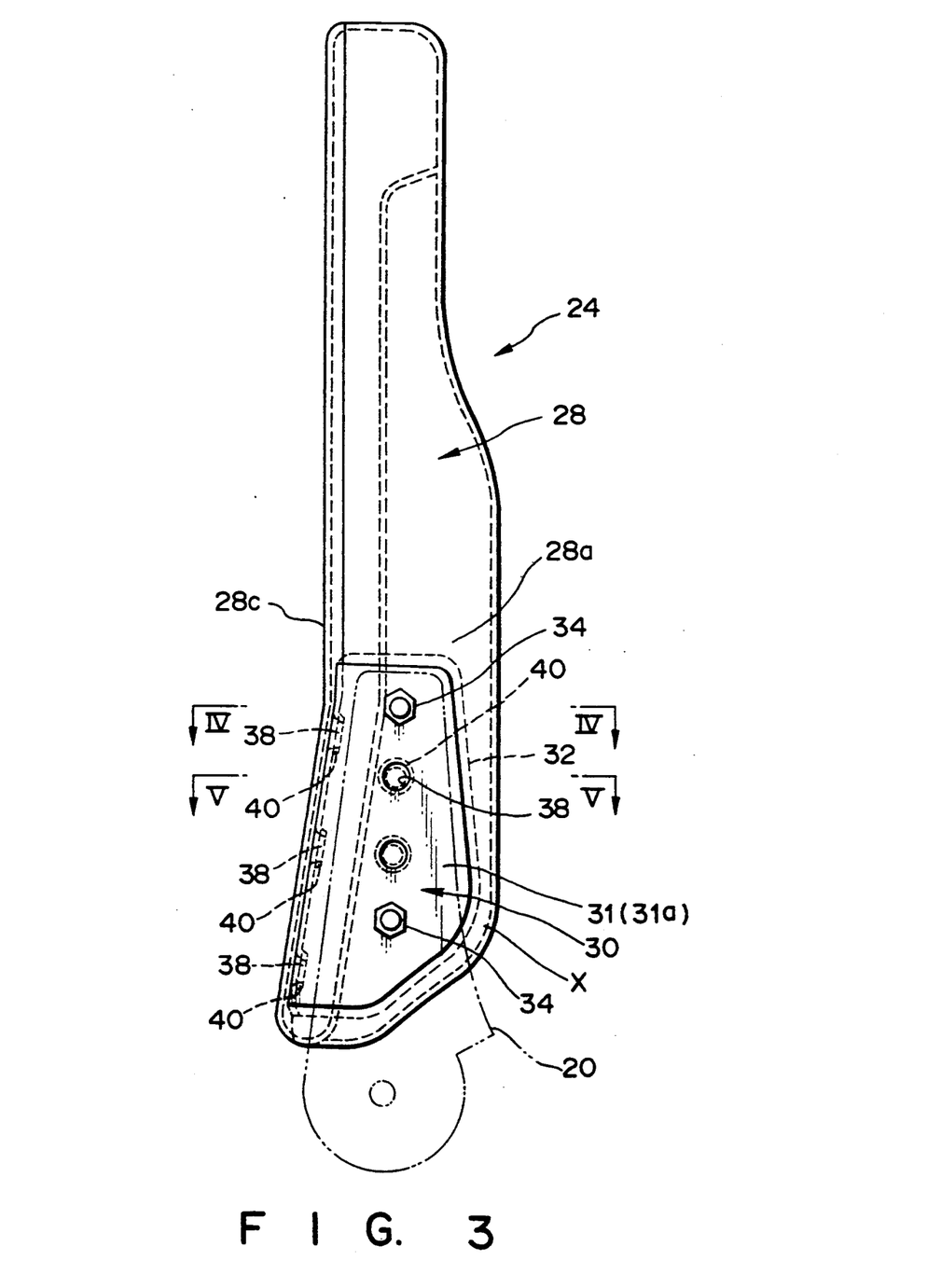
FIG. 3 is a side view of the seat back frame shown in FIG. 2 along a line III—III.

FIG. 2 is a front view of the seat back frame 24 (its left half portion is omitted), and FIG. 3 is a side view thereof.

The seat back frame 24 is constituted by the substantially hollow-plate like seat frame main body 28 having a side surface 28a, a rear surface 28b and a front surface 28c, and the pair of right and left metal piece mounting members 30 attached to both sides (position indicated by symbol x) of the lower end of the seat frame main body 28 Since the back-side hinge plate 20 is externally fastened to each metal mounting member 30 by a bolt, as described above, the metal mounting member 30 must satisfy the following requirements: (1) the mounting member 30 must be fixed to the seat frame main body 28 to have a predetermined stiffness; (2) the mounting member 30 must have a flat shape and a predetermined fastening area; and (3) the surface of the mounting member 30 must be exposed to the outer surface of the seat frame main body 28.

According to the first embodiment, when each metal mounting member 30 having a relatively large surface area is fixed to the seat frame main body 28, a portion of the metal mounting member 30 is embedded during blow molding of the seat frame main body 28, as the characteristic feature of the present invention, to satisfy the requirements (1) through (3).

Figure 4:
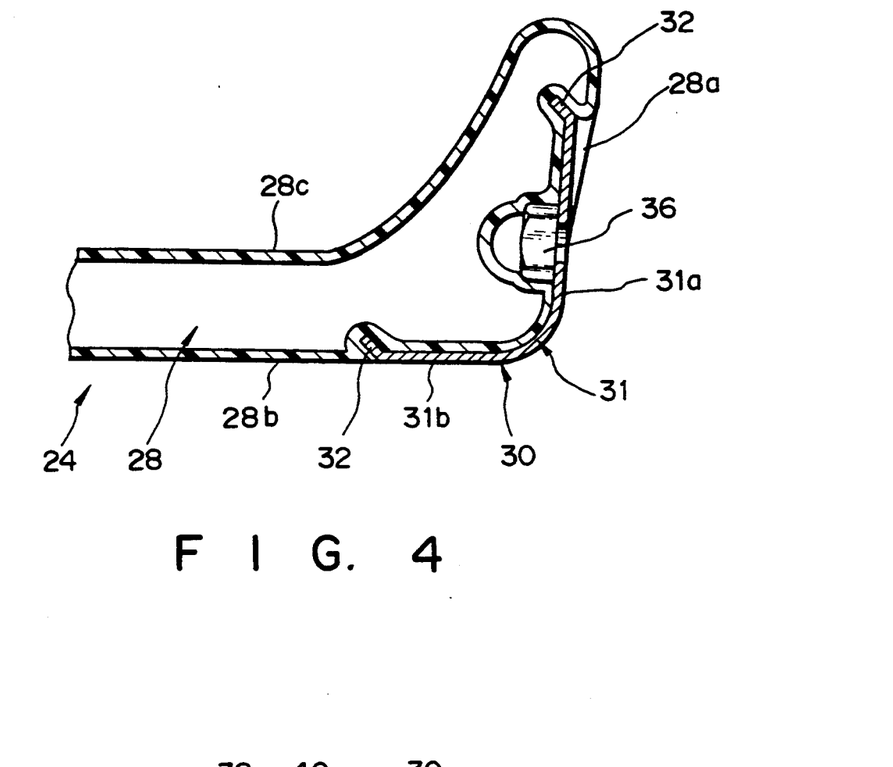
FIG. 4 is a cross-sectional view showing a main part of the seat back frame shown in FIG. 3 taken along a line IV—IV.

More specifically, each metal mounting member 30 comprises a mounting member main body 31 having a substantially L-shaped section, as shown in FIGS. 2 through 4. The outer peripheral edge portion of the mounting member main body 31 is formed to be obliquely bent toward the inner surface side over the entire periphery, and this bent edge is defined as a first edge portion 32. In the first embodiment, as can be seen from FIG. 4, the extending direction of the bent edge is set to be about 45 degrees with respect to an extending surface of a portion of the mounting member main body 31, where it is formed. Each metal mounting member 30 is entirely bent in a substantially L shape to cover a corner portion defined by a side hsurface 28a and a rear surface 28b of the seat frame main body 28. More specifically, one bent piece of the mounting member main body 31 of each metal mounting member 30 is defined by a first planar portion 31a to be fastened to the side surface 28a of the seat frame main body 28, as shown in FIG. 3, and the other bent piece thereof is defined by a second planar portion 31b to be fastened to the rear surface 28b of the seat frame main body 28, as shown in FIG. 2.

Figure 5:
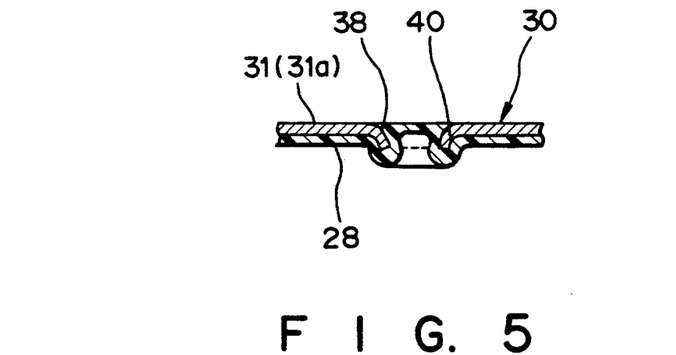
FIG. 5 is a cross-sectional view showing a main part of the seat back frame shown in FIG. 3 taken along a line V—V.

A plurality of cap nuts 36 for receiving bolts 34 for mounting the hinge plate are fixed in advance by welding on the inner surface of the first planar portion 31a. Furthermore, a plurality of notched hole portions 38 are formed at a predetermined pitch in the first and second planar portions 31a and 31b by punching from the outer to the inner surface side. In each notched hole portion 38, a curved portion formed by punching toward the inner surface side is set to be slightly inclined toward the center of the hole, so that the curved portion is defined as a second edge portion 40, as shown in FIG. 5. The extending direction of the second edge portion 40 is set to be about 45 degrees with respect to the extending surfaces of the planar portions 31a and 31b, as can be seen from FIG. 5.

A molding operation for integrally fixing the metal mounting members 30 to the seat frame main body 28 during blow molding will be briefly described below.

In this molding operation, the metal mounting members 30 are mounted in blow molding metal molds (not shown) for forming a resin molded body so that their outer surfaces contact the inner surface of a cavity of the metal molds. In this state, a synthetic resin is discharged from a parison (not shown) into the metal molds. After the resin is discharged, compressed air is blown into the metal molds to perform blow molding. With this molding operation, the synthetic resin is extended and molded along the inner surfaces of the metal molds, thus forming the seat frame main body 28 to which the metal mounting members 30 are integrally fixed.

During molding, as shown in FIG. 4, the first edge portion 32 of each metal mounting member 30 is wrapped in the synthetic resin forming the seat frame main body 28 in an oblique embedded state. Therefore, the first edge portion 32 is coupled to the synthetic resin portion covering its outer surface side in a direction to separate the metal mounting member 30 from the seat frame main body 28, thus preventing the metal mounting member 30 from being disengaged from the seat frame main body 28.

In the first and second planar portions 31a and 31b of each metal mounting member 30, as shown in FIG. 5, a portion of the synthetic resin constituting the seat frame main body 28 appears on the surface of the metal mold (i.e., the surface of the metal mounting member 30) through each notched hole portion 38 to wrap around the second edge portion 40 of each notched hole portion 38. Therefore, in each notched hole portion 38, its second edge portion 40 and the portion of the synthetic resin appearing outside through the notched hole portion are engaged with each other in a direction to disengage the metal mounting member 30 from the seat frame main body 28, thus preventing disengagement of the metal mounting member 30.

In the seat back frame 24 which is constituted by mounting the metal mounting members 30 to both the sides of the lower end of the seat frame main body 28, the seat frame main body 28 and the metal mounting members 30 can be firmly fixed to each other by a simple operation, i.e., by embedding the first and second edge portions 32 and 40 formed in given portions of each metal mounting member 30 during blow molding of the seat frame main body 28, without cutting out the seat frame main body 28 after molding.

When a formation position of each second edge portion 40 is set at a proper inner position of each metal mounting member 30, even if the metal mounting member 30 is constituted by a planar member having a relatively large surface area like in this first embodiment, not only the outer peripheral portion of the metal mounting member 30 but also its overall portion can be coupled at almost the same coupling strength. In this manner, local disengagement at an inner portion of the metal mounting member can be reliably prevented.

As a result, the coupling strength between the seat frame main body 28 and the metal mounting members 30 can be further increased by the mutual effect of these first and second edge portions 32 and 40.

In the first embodiment, the metal mounting members 30 are arranged on the outer surface side of the seat frame main body 28 in an exposed state, and the cap nuts 36 are directly mounted on the inner surfaces of the metal mounting members 30. As a result, when the hinge plate 20 is brought into contact with the outer surface side of each metal mounting member 30 and is fastened by the bolts 34 threadably engaged with the cap nuts 36, since no resin is interposed between the metal mounting member 30 and the hinge plate 20, looseness caused by plastic deformation of the synthetic resin due to a bolt fastening force can be reliably prevented, and the bolt fastening force can be increased. Thus, reliability of the seat back frame 24 can be further improved.

The present invention is not limited to the structure of the first embodiment described above, and various changes and modifications may be made within the spirit and scope of the invention.

For example, in the first embodiment described above, the seat frame structure of the present invention is applied to the seat back 14 side. However, the present invention is not limited to this application. For example, the seat frame structure may be applied to the seat cushion 12 side, or may be applied to both the seat cushion 12 and the seat back 14.

In the first embodiment, the first and second edge portions 32 and 40 are formed by bent portions obtained by obliquely bending the corresponding planar portions toward the inner surface side. However, the present invention is not limited to this structure. For example, the first and second edge portions 32 and 40 may have any other proper shapes, e.g., an L-shaped section as long as they project from the first planar portion 31a of each metal mounting member 30 toward the inner surface side at a predetermined angle.

Various other embodiments of the present invention will be described hereinafter. The same reference numerals throughout the following description denote the same parts as in the first embodiment described above, and a detailed description thereof will be omitted.

SECOND EMBODIMENT

Figure 6:
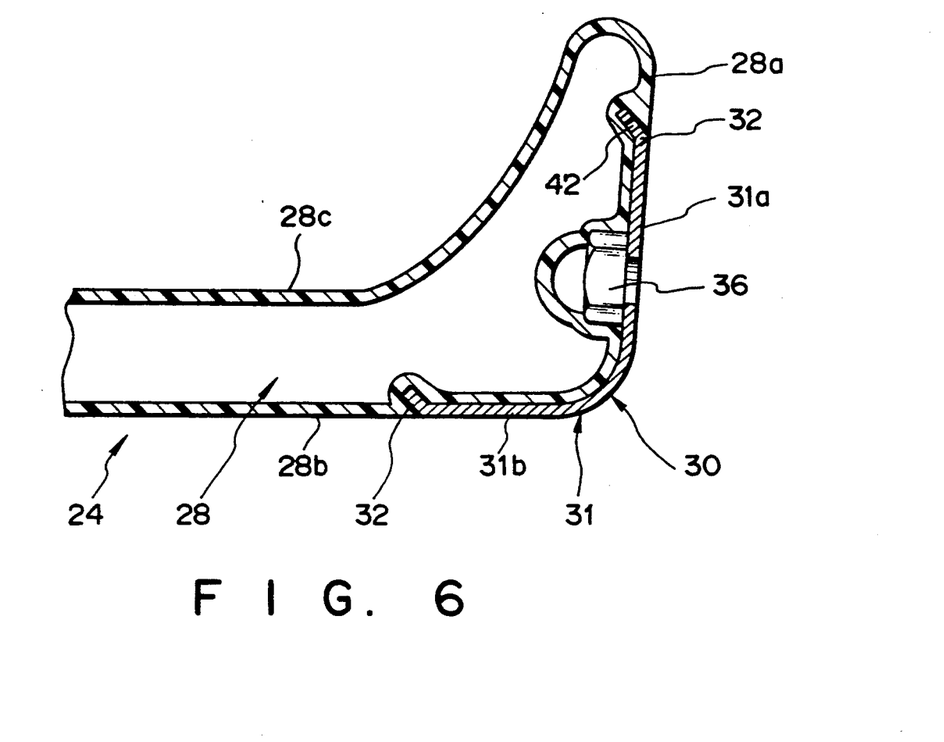
FIG. 6 is a cross-sectional view at the same sectional position as in FIG. 4 and showing a seat back frame to which a seat frame structure according to the second embodiment of the present invention is applied.
Figure 7:
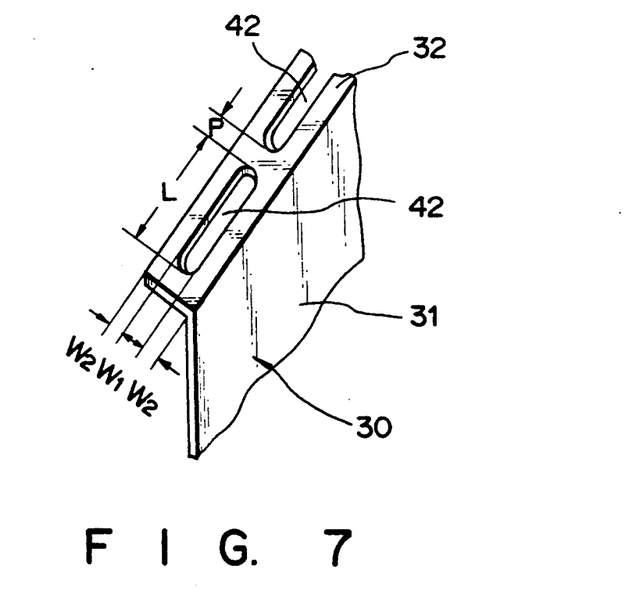
FIG. 7 is a perspective view showing a main part of a structure of a metal piece mounting member used in the seat back frame shown in FIG. 6.

In the first embodiment described above, the first edge portion 32 of each metal mounting member 30 is simply defined by a bent edge, i.e., by a flat surface without being worked at all. However, the present invention is not limited to this structure, and the first edge portion 32 may be formed as shown in FIGS. 6 and 7 as the second embodiment of the seat frame structure according to the present invention.

In the second embodiment, a plurality of opening portions 42 for allowing flow of a synthetic resin upon blow molding of the seat frame main body 28 are additionally formed at a predetermined pitch in the first edge portion 32 of each metal mounting member 30.

Note that a length L and a formation pitch P of each opening portion 42 can be appropriately selected according to requirements such as a shape, strength, and the like. A width $W_1$ of each opening portion 42 is set according to the length of the first edge portion 32. A ratio of the width $W_1$ of the opening portion 42 to a width $W_2$ of each portion left on two sides of the opening portion 42 is preferably set to be $W_1:W_2 = 3:2$.

With this structure, during blow molding of the seat frame main body 28, flow of the synthetic resin from the inner toward the outer surface side of the first edge portion 32 is allowed through the opening portions 42 formed in the first edge portion 32. As a result, a local small thickness which tends to occur due to a shortage of a resin appearing on the outer surface side of the first edge portion 32 when no opening portions 42 are formed can be easily prevented. More specifically, a coupling strength between the seat frame main body 28 and the metal mounting members 30 can be further increased.

In the second embodiment, the opening portions 42 are formed in only the front-side of the first edge portion 32 since a stress tends to be concentrated due to a load, such as a backward load, when a small-thickness portion is formed around the front-side of the first edge portion 32, and this portion may be damaged. Therefore, the opening portions 42 may also be formed in the remaining portion of the first edge portion 32.

THIRD EMBODIMENT

Figure 8:
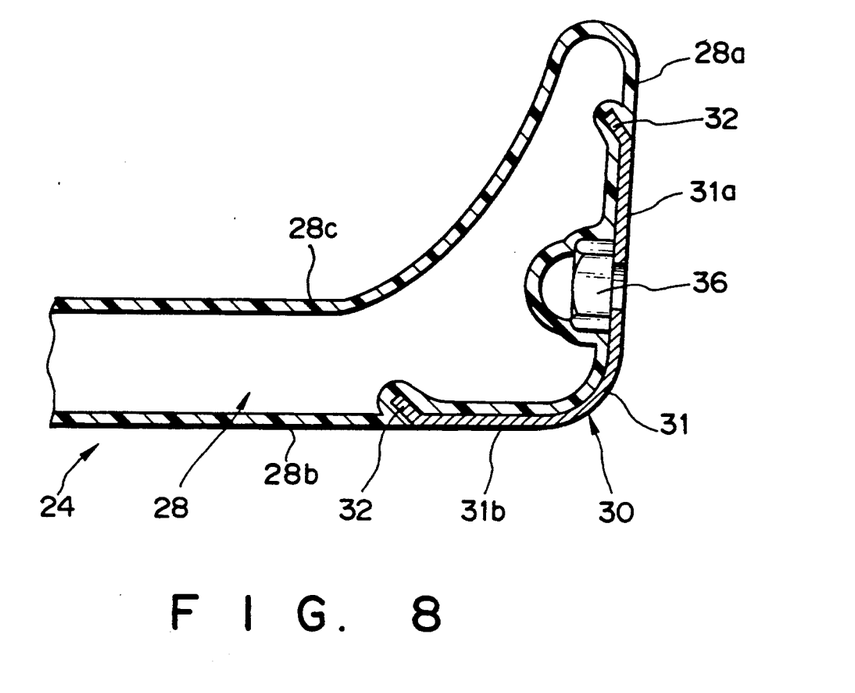
FIG. 8 is a cross-sectional view taken along a section passing a first edge portion and showing a seat back frame to which a seat frame structure according to the third embodiment of the present invention is applied.

In the first embodiment, the first edge portion 32 is formed over the entire peripheral edge of each metal mounting member 30. However, the present invention is not limited to this structure. For example, the first edge portion 32 may be formed as shown in FIGS. 8 through 10 as the third embodiment of the seat frame structure according to the present invention.

In the third embodiment, a plurality of first edge portions 32 are intermittently formed at predetermined intervals in the front portion of each metal mounting member 30. Furthermore, extending portions 44 formed by extending the first planar portion 31a of the metal mounting member 30 are integrally formed between these first edge portions 32. Note that widths $D_1$ and $D_2$ of each first edge portion 32 and extending portion 44 are set to be almost equal to each other, e.g., about 10 mm.

Figure 9:
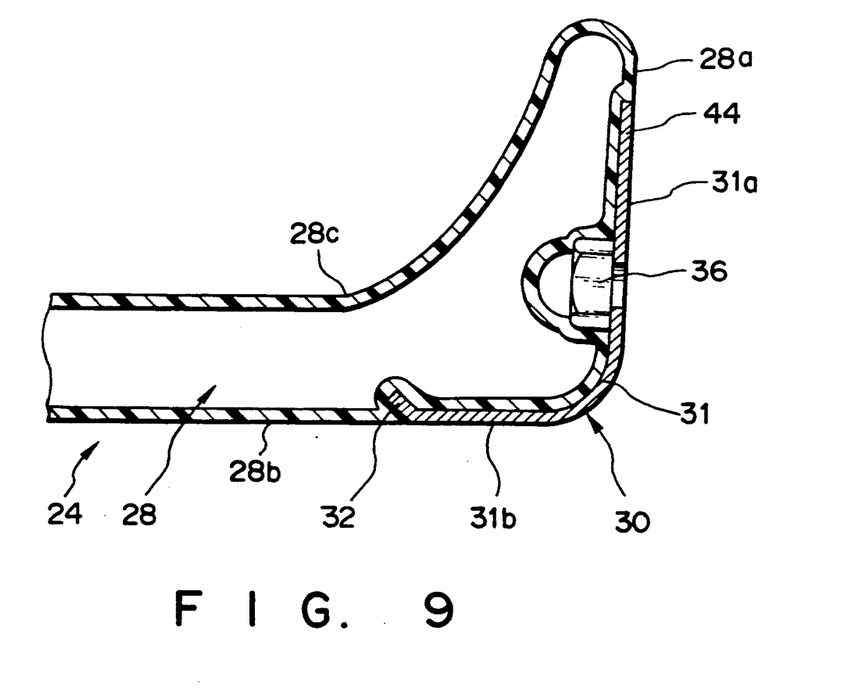
FIG. 9 is a cross-sectional view showing a main part of the seat back frame shown in FIG. 8 taken along a section passing an extending portion.
Figure 10:
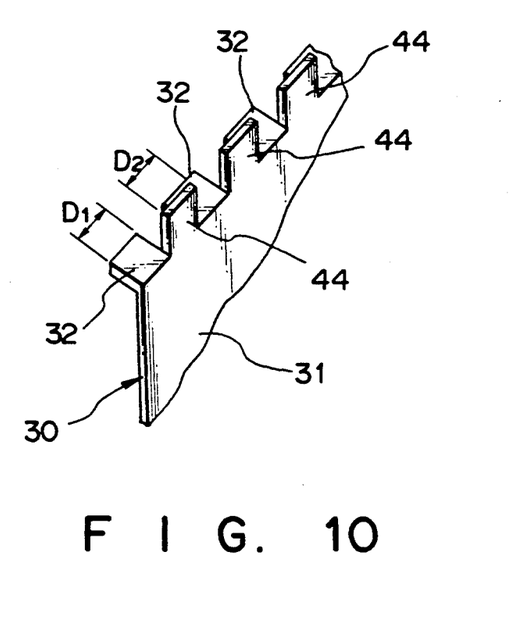
FIG. 10 is a perspective view showing a main part of a structure of a metal piece mounting member used in the seat frame structure shown in FIGS. 8 and 9.

According to the seat frame structure of the third embodiment, even when a resin appearing on the outer surface portions of the first edge portions 32 is short during blow molding of the seat frame main body 28, as shown in FIG. 9, a sufficient resin amount can be assured around the extending portions 44 formed between the first edge portions 32. In this manner, an increase in coupling strength between the seat frame main body 28 and the metal mounting member 30 through the first edge portions 32 and an increase in thickness of a resin layer through the extending portions 44 can be easily attained at the same time. Therefore, a coupling strength between the seat frame main body 28 and the metal mounting members 30 can be further increased.

In the third embodiment, the first edge portions 32 and the extending portions 44 are alternately formed on only the front outer peripheral portion of each metal mounting portion 30 since a stress tends to be concentrated due to a load, such as a backward load, when a small-thickness portion is formed around the front-side first edge portion 32, and this portion may be damaged. Therefore, the first edge portion 32 and the extending portions 44 may also be alternately formed on the remaining outer peripheral portion of the metal mounting member 30.

FOURTH EMBODIMENT

Figure 11:
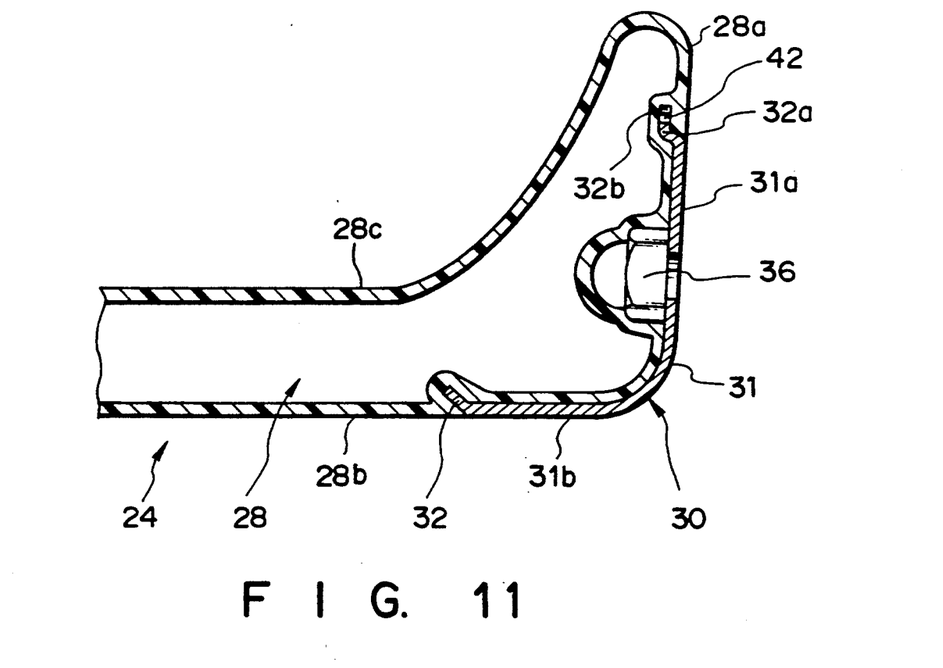
FIG. 11 is a cross-sectional view at the same sectional position as in FIG. 4 and showing a seat back frame to which a seat frame structure according to the fourth embodiment of the present invention is applied.
Figure 12:
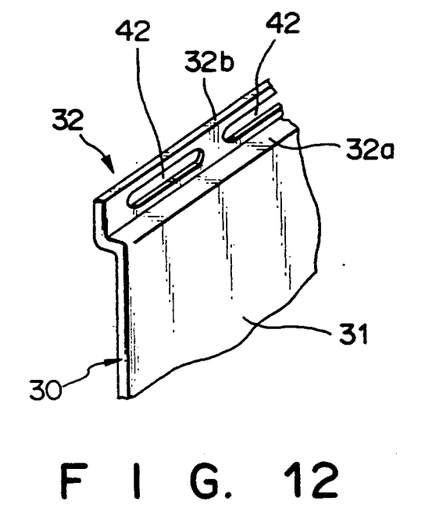
FIG. 12 is a perspective view showing a main part of a structure of a metal piece mounting member used in the seat back frame shown in FIG. 11.

In the first embodiment described above, the first edge portion 32 extends to be inclined at a predetermined angle with respect to the extending surface of each metal mounting member 30. However, the present invention is not limited to this arrangement. For example, the first edge portion 32 may be formed as shown in FIGS. 11 and 12 as the fourth embodiment of the seat frame structure according to the present invention.

In the fourth embodiment, the shape of the first edge portion 32 in the first embodiment is modified. More specifically, the first edge portion 32 of the fourth embodiment is constituted by a portion which integrally projects from the first planar portion 31a of the metal mounting member 30 toward the inner surface side and has a substantially L-shaped section. In other words, the first edge portion 32 is integrally formed by a first bent segment 32a contiguous with the first planar portion 31a to be bent inwardly therefrom at an angle of about 90 degrees, and a second bent segment 32b contiguous with the distal end of the first bent segment 32a to be bent forward therefrom at an angle of about 90 degrees. The same opening portions 42 as in the second embodiment are formed in the second bent segment 32b of the first edge portion 32. In this manner, according to the fourth embodiment, the coupling strength between the seat frame main body 28 and the metal mounting member 30 can be further improved as compared to the second embodiment.

FIFTH EMBODIMENT

Figure 13:
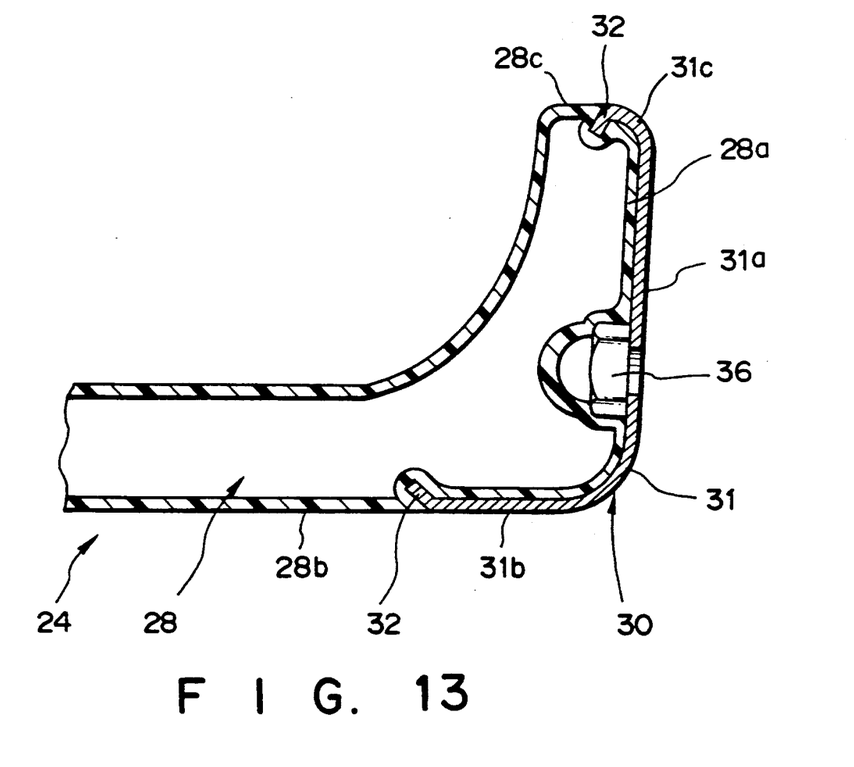
FIG. 13 is a cross-sectional view at the same sectional position as in FIG. 4 and showing a seat back frame to which a seat frame structure according to the fifth embodiment of the present invention is applied.

In each of the above embodiments, each metal mounting member 30 comprises the mounting member main body 31 constituted by the first and second planar portions 31a and 31b. However, the present invention is not limited to this structure. For example, the mounting member 30 may be constituted as shown in FIG. 13 as the fifth embodiment of the seat frame structure according to the present invention.

In the fifth embodiment, the first planar portion 31a extends forward to a front surface 28c of the seat frame main body 28. More specifically, in the fifth embodiment, the mounting member main body 31 comprises the first planar portion 31a attached to the side surface 28a of the seat frame main body 28, the second planar portion 31b attached to the rear surface 28b, and a third portion 31c attached to the front surface 28c. According to the fifth embodiment described above, each metal mounting member 30 can be formed to have a substantially U-shaped section, and sandwiches the seat frame main body 28 in the back-and-forth direction, thus greatly increasing a coupling strength between the seat frame main body 28 and the metal mounting members 30.

As described above, a seat frame structure for a vehicle seat according to the present invention comprises: a seat frame main body integrally formed by blow molding of a synthetic resin; and a metal mounting member fixed to a surface of the seat frame main body in an exposed state, wherein the metal mounting member includes an externally exposed mounting member main body; a first edge portion integrally formed on an outer peripheral portion of the mounting member main body, projecting from the outer peripheral portion toward an inner surface side at a predetermined angle, and embedded in the seat frame main body during blow molding of the seat frame main body; at least one hole portion formed in a portion of the mounting member main body located inwardly from the first edge portion thereof; and a second edge portion integrally formed on a peripheral edge of the hole portion, projecting from the mounting member main body toward the inner surface side at a predetermined angle, and embedded in the seat frame main body during blow molding of the seat frame main body.

In this manner, since each metal mounting member is fixed to the seat frame main body through the first and second edge portions at both its outer peripheral portion and notched hole portions of its inner portion, even if this metal mounting member has a relatively wide area, the metal mounting member can be almost entirely fixed to the seat frame main body at almost equal coupling strengths b appropriately selecting the positions or number of notched hole portions, and the seat frame main body and the metal mounting members can be satisfactorily and firmly fixed to each other.

Since each metal mounting member is exposed to the outer surface of the seat frame main body, when another metal piece, e.g., a hinge plate is externally fastened to this metal mounting member, no synthetic resin is interposed therebetween. Therefore, looseness caused by plastic deformation of the synthetic resin due to a bolt fastening force can be prevented, and even if a fastening force is increased, a synthetic resin can be prevented from being cracked. Thus, reliability upon assembly of the seat frame can be improved.

The opening portions for allowing flow of a synthetic resin during blow molding of the seat frame main body may be formed in the first edge portion formed on the outer periphery of each metal mounting member, thus obtaining a resin flow from the inner surface side toward the outer surface side of the first edge portion through these opening portions. As a result, a local small thickness which tends to occur due to a shortage of a resin appearing on the outer surface side of the first edge portion can be easily prevented, and a coupling strength between the seat frame main body 28 and the metal mounting members 30 can be further increased.

Furthermore, a plurality of first edge portions may be intermittently formed at predetermined intervals on a front portion of each metal mounting member, and extending portions obtained by extending a planar portion of the metal mounting member may be integrally formed between these first edge portions. As a result, even when a resin appearing on the outer surface portions of the first edge portions 32 is short during blow molding of the seat frame main body, a sufficient resin amount can be assured around the extending portions formed between the first edge portions. In this manner, an increase in coupling strength between the seat frame main body and the metal mounting member through the first edge portions and an increase in thickness of a resin layer through the extending portions can be easily attained at the same time. Therefore, a coupling strength between the seat frame main body and the metal mounting members can be further increased.

Moreover, the first and second edge portions extend to be inclined with respect to the extending surface of each mounting member main body. As a result, a coupling strength between the seat frame main body and the metal mounting member can be further increased.

As many apparently widely different embodiments of the present invention can be made without departing from the spirit and scope thereof, it is to be understood that the invention is not limited to the specific embodiments thereof except as defined in the appended claims.

What is claimed is:

1. A seat frame structure for a vehicle seat, which comprises:
   a seat frame main body integrally formed by blow molding of a synthetic resin; and a metal mounting member fixed to a surface of said seat frame main body in an exposed state,
said metal mounting member including
an externally exposed mounting member main body;
a first edge portion integrally formed on an outer peripheral portion of said mounting member main body, projecting at a predetermined angle from the outer peripheral portion toward an inner surface side of the metal mounting member facing the seat frame main body, and embedded in said seat frame main body during blow molding of said seat frame main body;
at least one hole portion formed in a portion of said mounting member main body located inwardly from said first edge portion thereof; and
a second edge portion integrally formed on a peripheral edge of said hole portion, projecting at a predetermined angle from said mounting member main body toward the inner surface side of the metal mounting member facing the seat frame main body, and embedded in said seat frame main body during blow molding of said seat frame main body.

2. The structure according to claim 1, wherein said first edge portion includes an opening portion for allowing flow of the synthetic resin during blow molding of said seat frame main body.

3. The structure according to claim 1, wherein said first edge portion is formed on the entire outer periphery of said mounting member main body.

4. The structure according to claim 1, wherein a plurality formed at predetermined intervals on at least a front outer peripheral portion of said mounting member main body.

5. The structure according to claim 4, wherein said mounting member main body integrally comprises extending portions located between said plurality of intermittently formed first edge portions and extending in an extending plane of said mounting member main body.

6. The structure according to claim 1, wherein said first edge portion is formed to have an L-shaped section.

7. The structure according to claim 6, wherein said first edge portion comprises, in a distal end portion thereof, an opening portion for allowing flow of the synthetic resin during blow molding of said seat frame main body.

8. The structure according to claim 6, wherein said L-shaped section of the first edge portion comprises a first bent segment bent inwardly from the outer peripheral portion of said mounting member main body at about 90 degrees, and a second bent forward from said first bent segment at about 90 degrees.

9. The structure according to claim 8, wherein said second bent segment of said L-shaped section of the first edge portion comprises, in a distal end portion thereof, an opening portion for allowing flow of the synthetic resin during blow molding of said seat frame main body.

10. The structure according to claim 1, wherein said mounting member main body is integrally formed by a first planar portion attached to a side surface of said seat frame main body, and a second planar portion attached to a rear surface of said seat frame main body.

11. The structure according to claim 10, wherein said mounting member main body further integrally comprises a third portion attached to a front surface of said seat frame main body.

12. The structure according to claim 11, wherein said first edge portion is formed extending from the third portion.

13. The structure according to claim 12, comprising a further first edge portion formed extending from the second planar portion.

14. The structure according to claim 10, wherein said first portion is formed extending from the first planar portion.

15. The structure according to claim 14, comprising a first edge portion formed extending from the second planar portion.

16. The structure according to claim 14, wherein said first edge portion includes an opening portion for allowing flow of the synthetic resin during blow molding of said seat frame main body.

17. The structure according to claim 16, wherein first edge portion is formed on the entire outer periphery of said mounting member main body.

18. The structure according to claim 14, wherein a plurality of said first edge portions are intermittently formed at predetermined intervals on at least a front outer peripheral portion of said mounting member main body.

19. The structure according to claim 1, wherein said first edge portion extends obliquely with respect to an extending surface of said mounting member main body.

20. The structure according to claim 1, wherein said second edge portion extends obliquely with respect to an extending surface of said mounting member main body.

* * * * *